No. 825,372. PATENTED JULY 10, 1906.
E. J. BEEVER.
COMBINED MATCH BOX AND OIL CAN.
APPLICATION FILED OCT. 23, 1905.
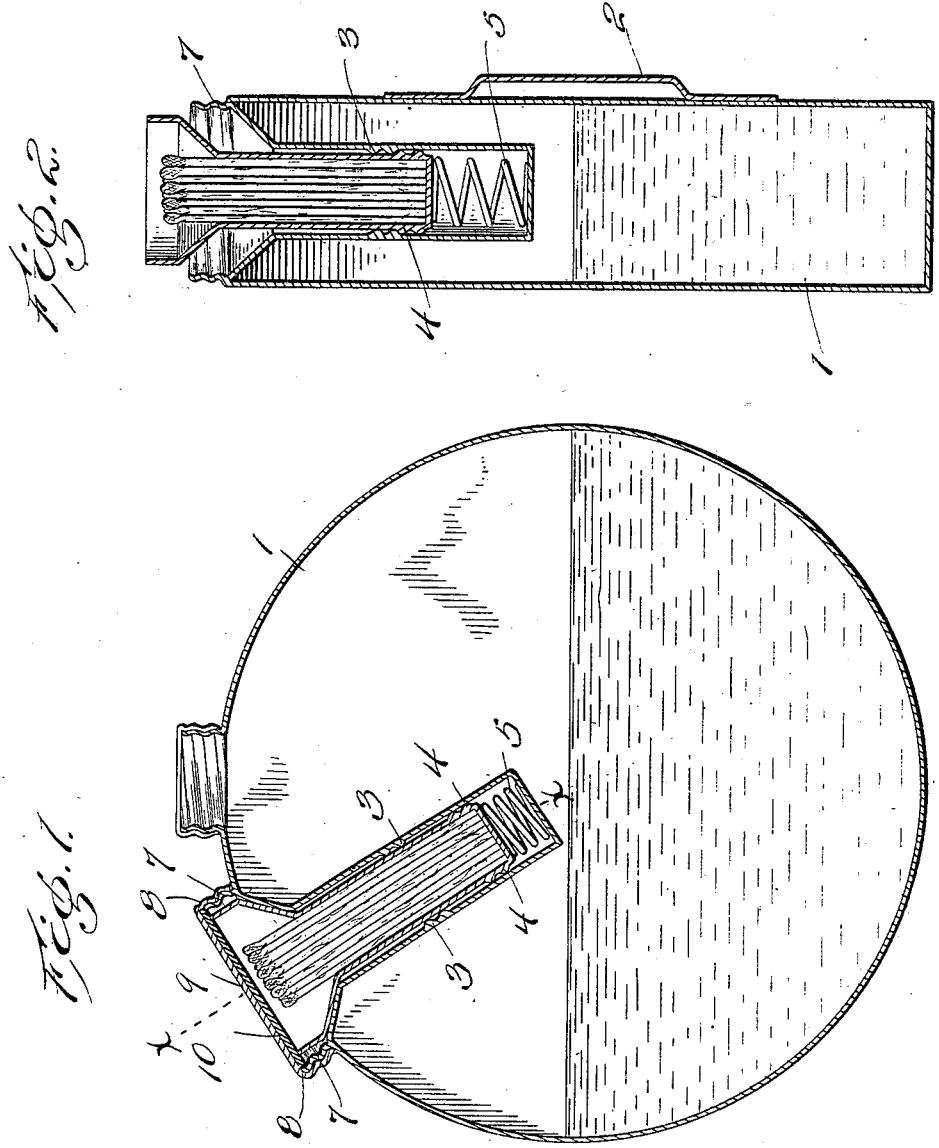
Witnesses
J. R. Thomas
Ruth Cooper
E. J. Beever, Inventor
By Swift & Co.
Attorneys

UNITED STATES PATENT OFFICE.

EDWARD J. BEEVER, OF JELLICO, TENNESSEE.

COMBINED MATCH-BOX AND OIL-CAN.

No. 825,372.  Specification of Letters Patent.  Patented July 10, 1906.

Application filed October 23, 1905. Serial No. 284,063.

*To all whom it may concern:*

Be it known that I, EDWARD J. BEEVER, a citizen of the United States, residing at Jellico, in the county of Campbell and State of Tennessee, have invented a new and useful Combined Match-Box and Oil-Can; and I do hereby declare the following to be a full, clear, and exact description of the invention, such as will enable others skilled in the art to which it appertains to make and use the same.

The invention relates to a combination oil-can and match-box, and has for its object to provide a device of this character which is exceedingly simple, inexpensive, and durable and which is adapted to be strapped to the waist of a miner, thereby protecting the matches from the dampness of the mines and such places, where they are often ruined.

With these and other objects in view the invention consists in the novel construction and arrangement of parts, hereinafter described and shown, and particularly pointed out in the appended claims.

In the drawings forming part of this specification and in which like numerals of reference designate corresponding parts, Figure 1 is a vertical sectional view of my invention. Fig. 2 is a sectional view taken on line X X of Fig. 1.

Referring to the drawings, 1 designates an approximately cylindrical oil-can having a handle forming a loop 2, by which said can may be conveniently strapped to the waist of a miner. The oil-can is also provided with a socket having a screw-threaded portion 3, said socket having a funnel-shaped mouth adapted to receive a match-box of like configuration.

The match-box is provided with a screw-threaded portion 4, which is adapted to engage the screw-threaded portion 3 of the socket. Both the match-box and the socket are provided with a smooth portion both above and below the screw-threaded portion, whereby the match-box is rendered slidable in said socket.

The socket is somewhat deeper than the length of the match-box, thereby providing a small space for the housing of a coiled spring 5, which engages the bottom of the match-box and the bottom of the socket, thereby thrusting the match-box outward when it is released by the removal of the top. This enables the matches to be readily grasped in the dark when desired for use. When the top is removed from the match-box, its outward movement is limited by the threaded portions coming into contact with each other, as will be readily understood, as illustrated in Fig. 2 of the accompanying drawings.

The mouth of the socket is provided with screw-threads 7, which are adapted to be engaged by screw-threads 8 of a suitable top or cap 9.

I desire it to be distinctly understood that the match-box may be placed on any portion of the oil-can and that other changes in the form, proportion, and minor details of construction may be made without departing from the spirit of the invention.

The top or cap 9 is preferably lined with rubber 10 or some other flexible material, that will remove the danger of accidentally igniting the matches, which would likely result from their heads coming into contact with metallic surface.

What I claim is—

1. A combined oil-can and match-box, designed for use in mines, having a loop for strapping the same to the waist of a miner, said oil-can having a socket with screw-threads therein; a receptacle also provided with screw-threads, by which said receptacle is retained in said socket, said screw-threads being adapted to act as shoulders for limiting the movement of said receptacle, substantially as described.

2. A device of the class described, comprising an oil-can having a socket therein, screw-threads formed in said socket, a screw-threaded receptacle adapted to reciprocate in said socket, a spring adapted to force said receptacle outward, said screw-threads being adapted to retain said receptacle in said socket, and to limit the movement of said receptacle, substantially as described.

In testimony whereof I have hereto affixed my signature in the presence of two witnesses.

EDWARD J. BEEVER.

Witnesses:
H. F. HAMBRIGHT,
FRANK L. SMITH.